United States Patent [19]

Kurata et al.

[11] Patent Number: 5,802,210

[45] Date of Patent: *Sep. 1, 1998

[54] IMAGE PROCESSING SYSTEM

[75] Inventors: Masanori Kurata, Yokohama, Japan; Ryusuke Murakami, Sunnyvale, Calif.; Yusei Itaya, Yokohama, Japan

[73] Assignee: Kabushiki Kaisha Toshiba, Kawasaki, Japan

[*] Notice: This patent issued on a continued prosecution application filed under 37 CFR 1.53(d), and is subject to the twenty year patent term provisions of 35 U.S.C. 154(a)(2).

[21] Appl. No.: 488,440

[22] Filed: Jun. 7, 1995

[30] Foreign Application Priority Data

Jun. 9, 1994 [JP] Japan ................. 6-127839

[51] Int. Cl.$^6$ ................. G06K 9/36; G06K 9/46
[52] U.S. Cl. ................. 382/235; 348/578; 382/166; 382/250
[58] Field of Search ................. 382/167, 250, 382/166, 248, 162, 235; 348/164, 393, 395, 403, 655, 405, 432, 578; 358/433, 539

[56] References Cited

FOREIGN PATENT DOCUMENTS

| 5284361 | 10/1993 | Japan | H04N 1/41 |
| WO 95/15538 | 6/1995 | WIPO |  |

OTHER PUBLICATIONS

Patent Abstracts of Japan, vol. 18, No. 69 (E–1502), Feb. 4, 1994, JP–A–05 284 361, Oct. 29, 1993.
Patent Abstracts of Japan, vol. 17, No. 575 (E–1449), Oct. 20, 1993, JP–A–05 167 920, Jul. 2, 1993.

*Primary Examiner*—Joseph Mancuso
*Assistant Examiner*—Timothy M. Johnson
*Attorney, Agent, or Firm*—Oblon, Spivak, McClelland, Maier & Neustadt, P.C.

[57] ABSTRACT

An image processing system conducts a video effect processing. In the mosaic-image-processing, a dc component of inversely quantized discrete cosine transform (DCT) coefficients is multiplied by a constant h other than zero and an ac component of the inversely quantized DCT coefficients is replaced with zero. In the case of monochromatic-image-processing, a dc component $D_y$ of a luminance block Y of the inversely quantized DCT coefficients is multiplied by a constant i other than zero and an ac component $A_y$ of the luminance block Y is multiplied by a constant I other than zero, dc components $D_{Cb}$ and $D_{Cr}$ of chrominance blocks Cb and Cr of the inversely quantized DCT coefficients are replaced with constants j and k, respectively, and ac components $A_{Cb}$ and $A_{Cr}$ of the chrominance blocks Cb and Cr are replaced with constants J and K, respectively. In the thermographic-image processing, a dc component $D_y$ of the luminance block Y is processed into dc components $D_{Cb}'=mD_y+n$ and $D_{Cr}'=pD_y+q$ where m, n, p and q are a constant, respectively, ac component $A_y$ of the luminance block Y is processed into ac components $A_{Cb}'=MA_y+N$ and $A_{Cr}'=PA_y+Q$ where M, N, P and Q are a constant, respectively, and the dc component $D_y$ and the ac component $A_y$ are replaced with constants s and S, respectively.

5 Claims, 6 Drawing Sheets

IMAGE PROCESSING SYSTEM

BACKGROUND OF THE INVENTION

The present invention relates to an image processing system, and more specifically to an image processing system provided with a video effect processing function in addition to an image compressing function for executing discrete cosine transform or to an image decompressing function for executing inverse discrete cosine transform.

Conventionally, there has been known such an image processing system which can generate mosaic-, monochromatic- or thermographic-image signals by processing ordinary image signals. The video image signal processing as described above is referred to as a video effect processing, hereinafter.

Figure 1:
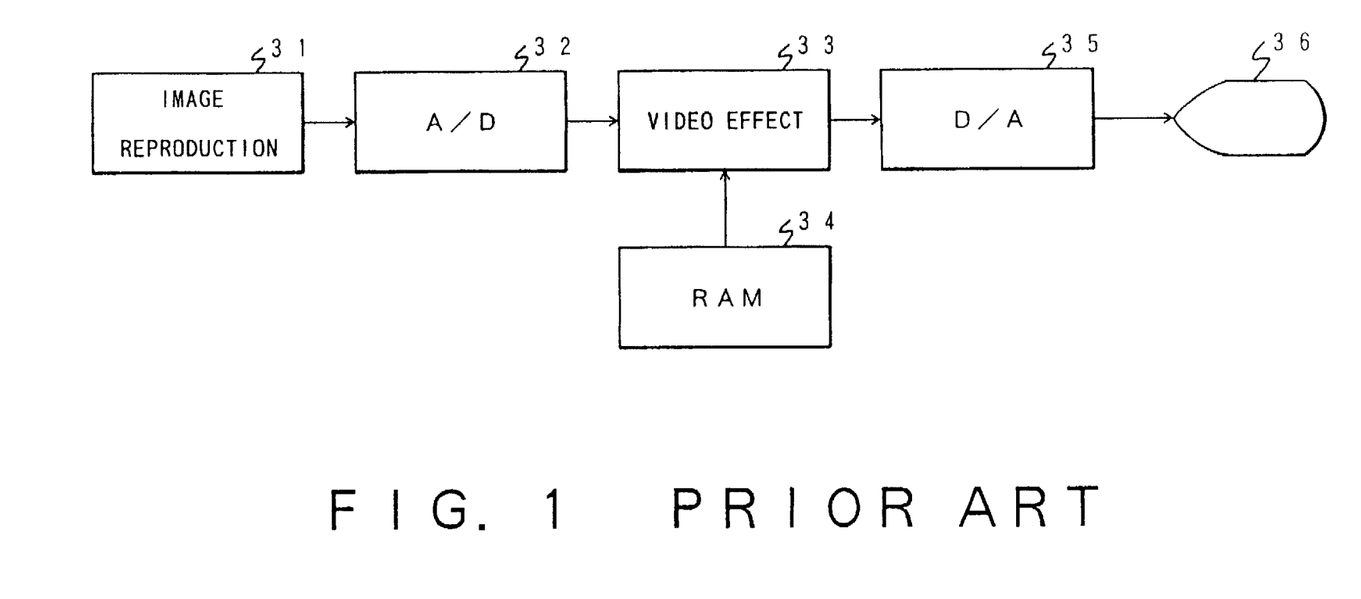
FIG. 1 is a block diagram showing a conventional image processing system.

FIG. 1 is a block diagram showing an example of the image processing system which can execute the video effect processing for an analog video signal. As shown in FIG. 1, an image signal outputted from an image reproduce section 31 is converted into digital image signals through an analog/digital converter 32, and then inputted to a video effect processing section 33. On the other hand, a RAM (Random Access Memory) 34 stores various processing data required to execute the video effect processing for the digital image signals in the form of tables. Therefore, the video effect processing section 33 retrieves necessary processing data corresponding to the inputted digital image signals from the RAM 34 and transforms the digital image signals on the basis of the retrieved processing data to execute the video effect processing (i.e., mosaic-image-processing, monochromatic-image-processing, thermographic-image-processing, etc.). The processed image signals are converted again into an analog signal through a digital/analog converter 35, and then displayed on a display unit 36.

Figure 2:
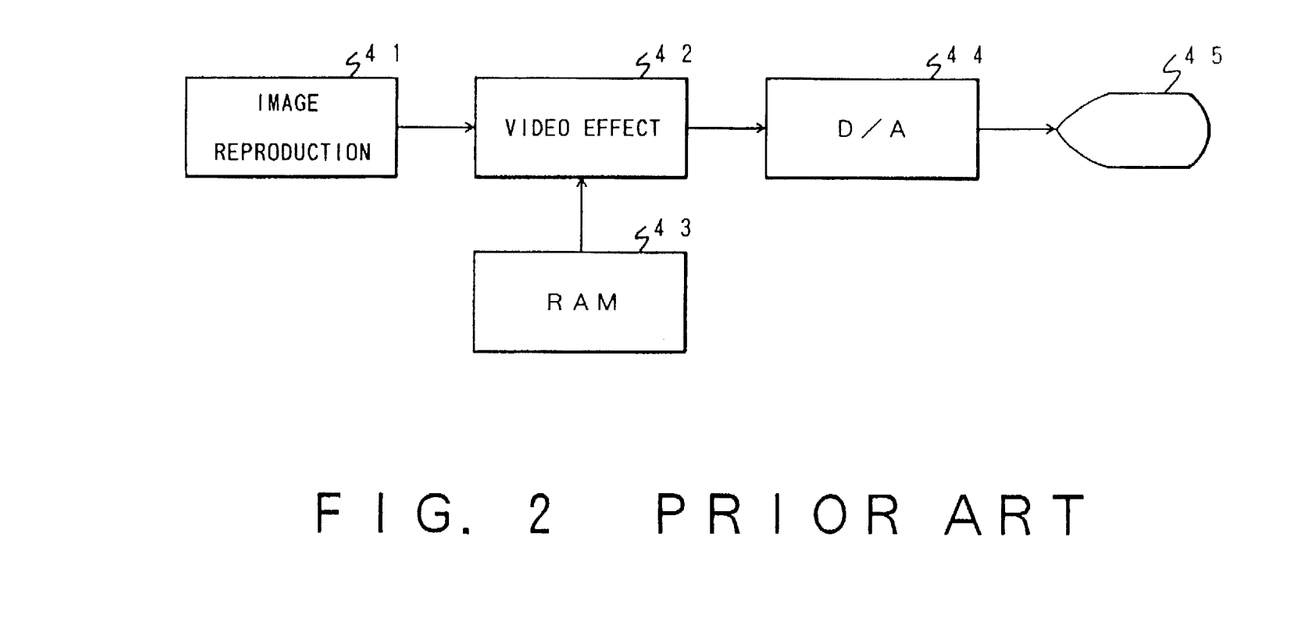
FIG. 2 is a block diagram showing another conventional image processing system.

Further, FIG. 2 is a block diagram showing another example of the image processing system which can execute the video effect processing for digital video signals (as used in a personal computer, for instance). As shown in FIG. 2, digital image signals outputted from an image reproduce section 41 are inputted to a video effect processing section 42. On the other hand, a RAM (Random Access Memory) 43 stores various processing data required to execute the effect processing for the digital image signals in the form of tables. Therefore, the video effect processing section 42 retrieves necessary processing data corresponding to the inputted digital image signals from the RAM 43, and executes the video effect processing for the digital image signals on the basis of the retrieved data, in the same way as with the case of the image processing system shown in FIG. 1. The processed digital image signals are converted again into an analog signal through a digital/analog converter 44, and then displayed on a display unit 45.

In the conventional image processing systems as described above, however, since a video effect processing section 33 or 42 must be provided additionally, there exists such a problem in that the circuit scale increases markedly. As a result, there exists a serious problem in that an increase in circuit scale causes an enlargement in chip area and further an increase in power consumption.

In the conventional image processing system, in particular, since the processing data required to transform the image signals are huge, it is necessary to use a large capacity of the RAM 34 or 43, which is a major factor of increasing the circuit scale of the image processing system.

In addition, with the spread of multimedia recently, an image processing system which can execute various video effect processing may be required more and more in addition to the mosaic image processing, monochromatic image processing, etc. However, when the conventional image processing system is constructed so as to execute a plurality of video effect processing, since the amount of the processing data required to transform image signals further increases, the circuit scale increases extraordinarily.

On the other hand, an image processing system for compacting the circuit scale is disclosed in Japanese Published Unexamined (Kokai) Patent Application No. 4-315371. In this prior art image processing system, some additional image processing such as edge emphasis or smoothing processing is provided for an image compressing system for executing the discrete cosine transform or for an image decompressing system for executing the inverse discrete cosine transform. In this image processing system, the quantization coefficients are modified in such a way that predetermined image processing can be executed whenever the discrete cosine transform coefficients outputted by the image compressing system are quantized or whenever the discrete cosine transform coefficients inputted to the image decompressing system are quantized inversely. In this image processing system, since the processing data for transforming the image signals are not required, a memory for storing the processing data is not needed, with the result that it is possible to reduce the circuit scale to that extent.

In this image processing system, however, since the image processing is executed by modifying the quantization coefficients, it is impossible to quantize image signals without image processing or to change the sorts of the image processing appropriately, so that it is difficult to apply this image processing system to the video effect processing.

SUMMARY OF THE INVENTION

With these problems in mind, therefore, it is the object of the present invention to provide an image processing system and an image processing method which can reduce an increase in circuit scale due to addition of the video effect processing function to the ordinary image processing functions.

To achieve the above-mentioned object, the present invention provides an image processing system having an inverse quantizing section for inversely quantizing inputted discrete cosine transform coefficients, an inverse discrete cosine transforming section for inversely discrete cosine transforming obtained inversely quantized discrete cosine transform coefficients and a digital-to-analog converting section for converting obtained inverse discrete cosine transform coefficients, comprising: dc component processing means for multiplying a dc component of the inversely quantized discrete cosine transform coefficients by a constant h other than zero; and ac component processing means for replacing an ac component of the inversely quantized discrete cosine transform coefficients with zero, wherein the inversely quantized discrete cosine transform coefficients outputted from the dc and ac component processing means and thus processed by mosaic-image-processing are inputted to the inverse discrete cosine transforming section.

Further, to achieve the above-mentioned object, the present invention provides an image processing system having an inverse quantizing section for inversely quantizing inputted discrete cosine transform coefficients, an inverse discrete cosine transforming section for inversely discrete cosine transforming obtained inversely quantized discrete cosine transform coefficients and a digital-to-analog converting section for converting obtained inverse discrete cosine transform coefficients, comprising: luminance dc component processing means for multiplying a dc component $D_y$ of a luminance block Y of the inversely quantized discrete cosine transform coefficients by a constant i other than zero; luminance ac component processing means for multiplying an ac component $A_y$ of the luminance block Y by a constant I other than zero; chrominance dc component processing means for replacing dc components $D_{Cb}$ and $D_{Cr}$ of chrominance blocks Cb and Cr of the inversely quantized discrete cosine transform coefficients with constants j and k; and chrominance ac component processing means for replacing ac components $A_{Cb}$ and $A_{Cr}$ of the chrominance blocks Cb and Cr with constants J and K, wherein the inversely quantized discrete cosine transform coefficients outputted from the luminance dc and ac component processing means and the chrominance difference dc and ac component processing means and thus processed by monochromatic-image-processing are inputted to the inverse discrete cosine transform section.

Further, to achieve the above-mentioned object, the present invention provides an image processing system having a video effect processing section for thermographic-image-processing inputted discrete cosine transform coefficients and for outputting the processed signals, the video effect processing section comprising: chrominance dc component processing means for forming dc components $D_{Cb}'=mD_y+n$ and $D_{Cr}'=pD_y+q$ of chrominance blocks Cb' and Cr' of the output signals by inputting a dc component $D_y$ of a luminance block Y of the discrete cosine transform coefficients, where m, n, p and q are a constant, respectively; chrominance ac component processing means for forming ac components $A_{Cb}'=MA_y+N$ and $A_{Cr}'=PA_y+Q$ of the chrominance blocks Cb' and Cr' of the output signals by inputting an ac component $A_y$ of the luminance block Y of y the discrete cosine transform coefficients, where M, N, P and Q are a constant, respectively; and luminance component processing means for forming a dc component $D_y'$ and an ac component $A_y'$ of a luminance block Y' of the output signals by replacing the dc component $D_y$ and the ac component $A_y$ of the luminance block Y of the inputted discrete cosine transform coefficients with s and S, respectively, where s and S are a constant, respectively.

Further, the present invention provides an image processing method comprising the steps of: inversely quantizing inputted discrete cosine transform coefficients; multiplying a dc component of obtained inversely quantized discrete cosine transform coefficients by a constant h other than zero and replacing an ac component of the inversely quantized discrete cosine transform coefficients with zero, thus applying mosaic-image-processing to the inversely quantized discrete cosine transform coefficients; inversely discrete cosine transforming the inversely quantized discrete cosine transform coefficients thus applied the mosaic-image-processing; and converting obtained inverse discrete cosine transform coefficients to analog signals.

Further, the present invention provides an image processing method comprising the steps of: inversely quantizing inputted discrete cosine transform coefficients; multiplying a dc component $D_y$ of a luminance block Y of obtained inversely quantized discrete cosine transform coefficients by a constant i other than zero, multiplying an ac component $A_y$ of the luminance block Y by a constant I other than zero, replacing dc components $D_{cb}$ and $D_{cr}$ of chrominance blocks $C_b$ and $C_r$ of the inversely quantized discrete cosine transform coefficients with constants j and k and replacing ac components $A_{cb}$ and $A_{cr}$ of the chrominance blocks $C_b$ and $C_r$ with constants J and K, thus applying monochromatic-image-processing to the inversely quantized discrete cosine transform coefficients; inversely discrete cosine transforming the inversely quantized discrete cosine transform coefficients thus applied the monochromatic-image-processing; and converting obtained inverse discrete cosine transform coefficients to analog signals.

Further, the present invention provides an image processing method for applying thermographic-image-processing to inputted discrete cosine transform coefficients and outputting the processed signals as output signals, comprising the steps of: forming dc components $D_{cb}'=mD_y+n$ and $D_{cr}'=pD_y+q$ of chrominance blocks Cb' and Cr' of the output signals by inputting a dc component $D_y$ of a luminance block Y of the discrete cosine transform coefficients, where m, n, p and q are a constant, respectively; forming ac components $A_{Cb}'=MA_y+N$ and $A_{Cr}'=PA_y+Q$ of the chrominance blocks Cb' and Cr' of the output signals by inputting an ac component $A_y$ of the luminance block Y, where M, N, P and Q are a constant, respectively; and forming a dc component $D_y'$ and an ac component $A_y'$ of a luminance block Y' of the output signals by replacing the dc component $D_y$ and the ac component $A_y$ with s and S, respectively, where s and S are a constant, respectively.

DETAILED DESCRIPTION OF THE EMBODIMENTS

The embodiments of the image processing system according to the present invention will be described hereinbelow by taking the case when applied to a system for decompressing image signals.

Figure 3:
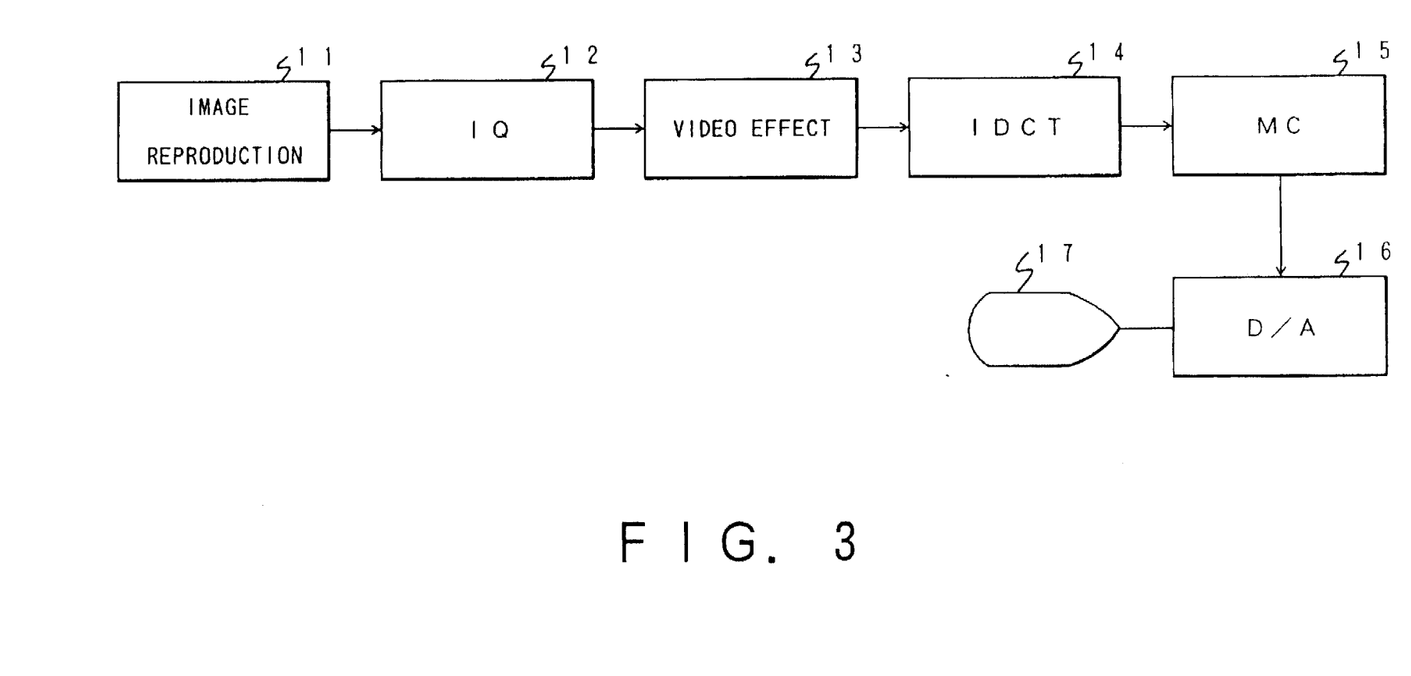
FIG. 3 is a schematic block diagram showing a preferred embodiment of the image processing system according to the present invention.

FIG. 3 is a schematic block diagram showing the structure of the image processing system according to the present invention. In FIG. 3, discrete cosine transform image information, that is, discrete cosine transform coefficients are outputted from an image reproduce section 11. The output signals of the image reproduce section 11 are inversely quantized by an IQ (inverse quantize) section 12. The inversely quantized signals are supplied to a video effect processing section 13 that executes the video effect processing (mosaic-image-processing, monochromatic-image-processing, or thermographic-image-processing, etc.)

selected on the basis of a select signal (not shown). The output signals of the video effect processing section 13 are transformed inversely by an IDCT (inverse discrete cosine transform) section 14, and further motion-compensated for by an MC (motion compensate) section 15. The output of the MC section 15 is converted into an analog signal by a digital/analog converter 16, and then displayed on a display unit 17.

Here, the discrete cosine transform coefficients will be explained briefly.

The discrete cosine transform coefficients are composed of three coefficients of a luminance coefficient Y, and two chrominance coefficients Cb and Cr. The inverse discrete cosine transform is executed for these three sorts of coefficients Y, Cb and Cr for each block unit of 8×8pixels. Here, a block composed of luminance coefficients Y is referred to as a luminance block Y; a block composed of chrominance coefficients Cb is referred to as a chrominance block Cb; and a block composed of chrominance coefficients Cr is referred to as a chrominance block Cr, respectively. As expressed by the following formula (1), the luminance block Y has a single-unit of dc component $D_y$ and 63-units of ac components $A_y$. In the same way, as expressed by the following formulae (2) and (3), the chrominance difference block Cb or Cr has a single-unit of dc component $D_{Cb}$ or $D_{Cr}$ and 63-units of ac components $A_{Cb}$ or $A_{Cr}$, respectively.

$$Y = \begin{pmatrix} D_y & A_y & \cdots & A_y \\ A_y & A_y & \cdots & A_y \\ \cdot & & & \cdot \\ \cdot & & & \cdot \\ \cdot & & & \cdot \\ A_y & \cdots & \cdots & A_y \end{pmatrix} \quad (1)$$

$$C_r = \begin{pmatrix} D_{Cr} & A_{Cr} & \cdots & A_{Cr} \\ A_{Cr} & A_{Cr} & \cdots & A_{Cr} \\ \cdot & & & \cdot \\ \cdot & & & \cdot \\ A_{Cr} & \cdots & \cdots & A_{Cr} \end{pmatrix} \quad (2)$$

$$Cb = \begin{pmatrix} D_{Cb} & A_{Cb} & \cdots & A_{Cb} \\ A_{Cb} & A_{Cb} & \cdots & A_{Cb} \\ \cdot & & & \cdot \\ \cdot & & & \cdot \\ A_{Cb} & \cdots & \cdots & A_{Cb} \end{pmatrix} \quad (3)$$

Here, the video effect processing section 13 will be described in more detail hereinbelow.

First, the operation for executing the mosaic-image-processing by the video effect processing section 13 will be explained hereinbelow.

In the mosaic-image-processing, the respective dc components $D_y$, $D_{Cb}$ and $D_{Cr}$ of the respective blocks Y, Cb and Cr for forming the discrete cosine transform coefficients are multiplied by h (a constant other than zero) to form the dc components $D_y'$, $D_{Cb}'$ and $D_{Cr}'$ of the output signals. In addition, the respective ac components $A_y$, $A_{Cb}$ and $A_{Cr}$ of the respective blocks Y, Cb and Cr are replaced with zero to form the ac components $A_y'$, $A_{Cb}'$ and $A_{Cr}'$ of the output signals.

The above-mentioned arithmetic processing can be obtained by executing the following matrix operations (4) and (5):

$$\begin{pmatrix} D_y' \\ D_{Cb}' \\ D_{Cr}' \\ D_1 \end{pmatrix} = \begin{pmatrix} h & 0 & 0 & 0 \\ 0 & h & 0 & 0 \\ 0 & 0 & h & 0 \\ 0 & 0 & 0 & h \end{pmatrix} \begin{pmatrix} D_y \\ D_{Cb} \\ D_{Cr} \\ D_1 \end{pmatrix} \quad (4)$$

where $h \neq 0$ $$\begin{pmatrix} A_y' \\ A_{Cb}' \\ A_{Cr}' \\ A_1 \end{pmatrix} = \begin{pmatrix} 0 & 0 & 0 & 0 \\ 0 & 0 & 0 & 0 \\ 0 & 0 & 0 & 0 \\ 0 & 0 & 0 & 0 \end{pmatrix} \begin{pmatrix} A_y \\ A_{Cb} \\ A_{Cr} \\ 1 \end{pmatrix} \quad (5)$$

Here, $D_1$ and $A_1$ denote dummy variables, respectively. These dummy variables are not outputted to the IDCT section 14. The reason why these dummy variables are used is that a matrix of four-rows and four-columns is used as the determinant. Further, the reason why the matrix of four-rows and four-columns is used as the determinant is that a four-row four-column determinant is required to be used in the thermographic-image-processing (as described later). If considered is only the mosaic-image-processing, it is available to use a matrix of at least three-rows and three-columns.

Further, in the formula (5) above, corresponding elements (arranged in the same rows and in the same columns) in the respective blocks Y, Cb and Cr are operated simultaneously.

Figure 4:
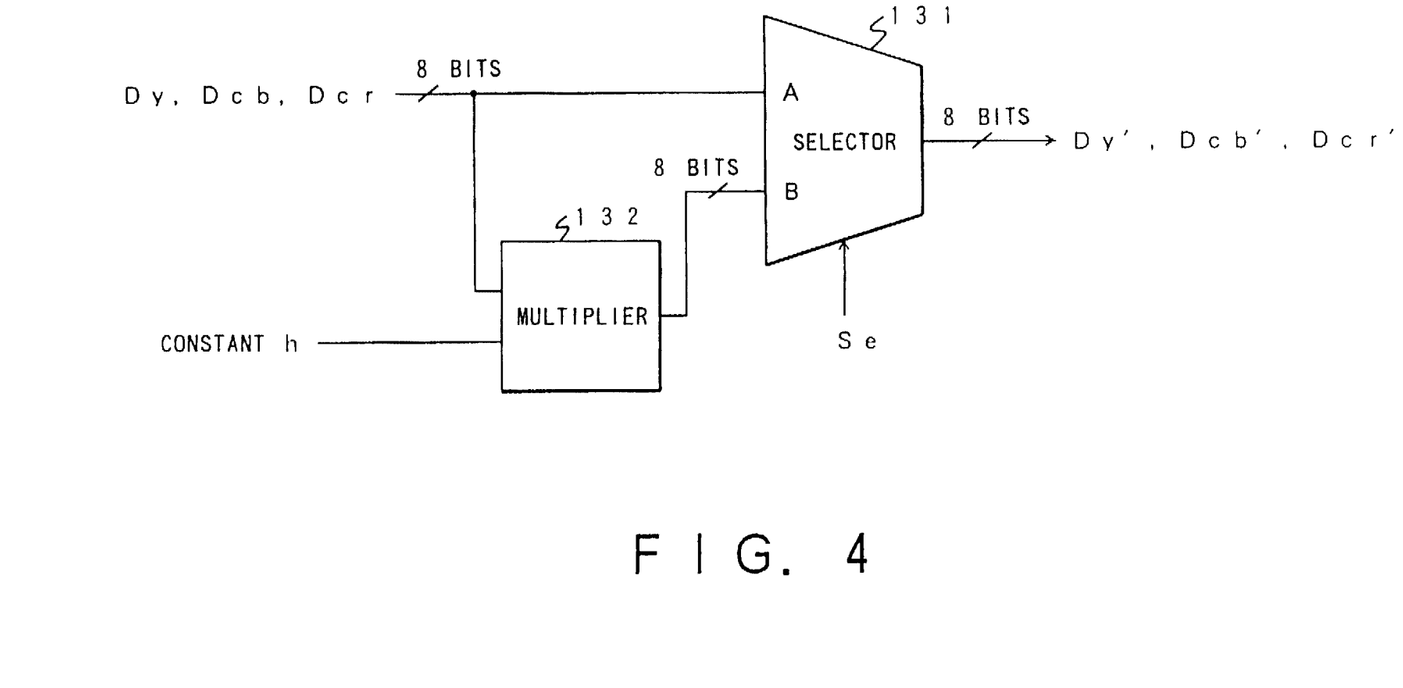
FIG. 4 is an electric circuit diagram showing a structural example of the circuit for executing mosaic-image-processing in the image processing system related to the embodiment according to the present invention shown in FIG. 3.
Figure 5:
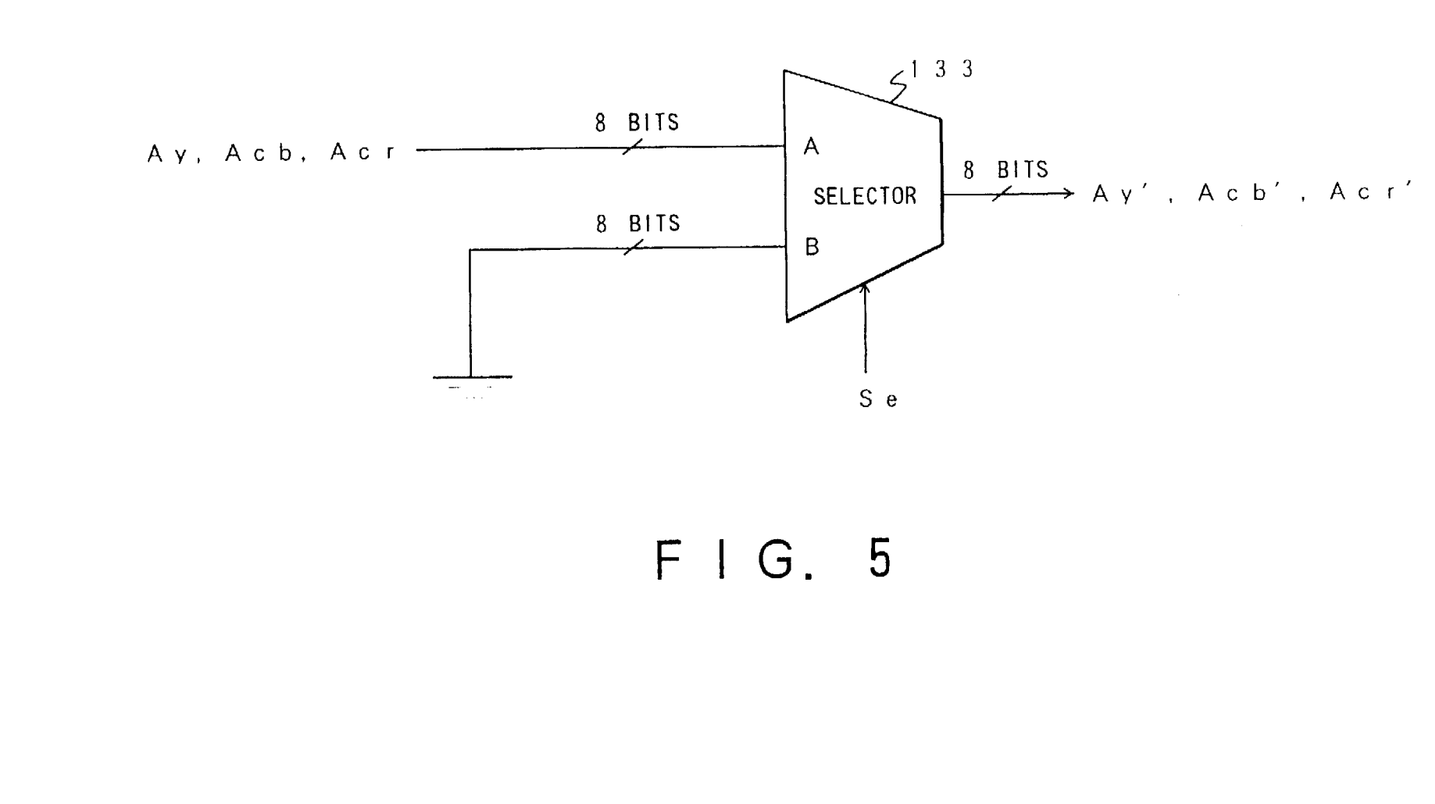
FIG. 5 is another electric circuit diagram showing a structural example of the circuit for executing mosaic-image-processing in the image processing system related to the embodiment according to the present invention shown in FIG. 3.

Further, although the above-mentioned matrix operation can be executed in accordance with software, it is also possible to execute the same matrix operation by use of hardware. FIGS. 4 and 5 show examples of the circuit (hardware) constructions for executing the arithmetic processing as expressed by the formulae (4) and (5).

In FIG. 4, three dc components $D_y$, $D_{cb}$ and $D_{cr}$ are inputted in sequence through an input A of a selector 131. These dc components are also inputted in sequence to a multiplier 132 and multiplied by h (a constant other than zero), and then inputted to an input B of the selector 131. In the case of the mosaic-image-processing, the input B of the selector 131 is selected under control of a select signal Se, so that dc components $D_y'$, $D_{cb}'$ and $D_{cr}'$ are outputted as the results of multiplying the dc components $D_y$, $D_{cb}$ and $D_{cr}$ by the constant h. Further, in the case where the mosaic-image-processing is not executed, the selector 131 selects the input A, so that the dc components $D_y$, $D_{cb}$ and $D_{cr}$ are outputted as they are.

Next, in FIG. 5, three ac components $A_y$, $A_{Cb}$ and $A_{Cr}$ are inputted in sequence through an input A of a selector 133, and zero is inputted through an input B thereof. Here, in the case of the mosaic-image-processing, the input B of the selector 133 is selected under control of a select signal Se, so that zero is outputted as the output signals $A_y'$, $A_{Cb}'$ and $A_{Cr}'$. Further, in the case where the mosaic-image-processing is not executed, the selector 133 selects the input A, so that the ac components $A_y$, $A_{Cb}$ and $A_{Cr}$ are outputted as they are. Signal processing as described with respect to FIGS. 4 and 5 are simultaneously conducted under control of the select signal Se.

Secondly, the operation for executing the monochromatic-image-processing by the video effect processing section 13 will be explained hereinbelow.

In the monochromatic-image-processing, the dc component $D_y$ of the luminance block Y for forming the discrete cosine transform coefficients is multiplied by i (a constant other than zero) to form the dc component $D_y'$ of the luminance block Y' of the output signals. Further, the ac component $A_y$ of the luminance block Y is multiplied by I (a constant other than zero) to form the ac component $A_y'$ of the luminance block Y' of the output signals. In addition, the respective dc components $D_{Cb}$ and $D_{Cr}$ of the respective chrominance blocks Cb and Cr are replaced with j and k (a constant, respectively), respectively to form the dc components $D_{Cb}'$ and $D_{Cr}'$ of the chrominance blocks Cb' and Cr' of the output signals, and further the respective ac components $A_{Cb}$ and $A_{Cr}$ of the respective chrominance blocks Cb and Cr are replaced with J and K (a constant, respectively), respectively to form the ac components $A_{Cb}'$ and $A_{Cr}'$ of the chrominance blocks Cb' and Cr' of the output signals. By the above-mentioned processing, it is possible to realize a monochromatic image in which only the luminance varies.

The above-mentioned arithmetic processing can be obtained by executing the following matrix operations (6) and (7):

$$\begin{pmatrix} D_y' \\ D_{Cb}' \\ D_{Cr}' \\ D_2 \end{pmatrix} = \begin{pmatrix} i & o & o & o \\ o & o & o & j \\ o & o & o & k \\ o & o & o & d \end{pmatrix} \begin{pmatrix} D_y \\ D_{Cb} \\ D_{Cr} \\ 1 \end{pmatrix} \quad (6)$$

where i, j, k, d=constant $$\begin{pmatrix} A_y' \\ A_{Cb}' \\ A_{Cr}' \\ A_2 \end{pmatrix} = \begin{pmatrix} I & 0 & 0 & 0 \\ 0 & 0 & 0 & J \\ 0 & 0 & 0 & K \\ 0 & 0 & 0 & D \end{pmatrix} \begin{pmatrix} A_y \\ A_{Cb} \\ A_{Cr} \\ 1 \end{pmatrix} \quad (7)$$

where I, J, K, D=constant

Here, $D_2$ and $A_2$ denote dummy variables, respectively. These dummy variables are not outputted to the IDCT section 14. The reason why these dummy variables are used is that a matrix of four-rows and four-columns is used as the determinant. Further, the reason why the matrix of four-rows and four-columns is used as the determinant is that a four-row four-column determinant is required to be used in the thermographic-image-processing (as described later). If considered is only the monochromatic-image-processing, it is available to use a matrix of at least three-rows and three-columns.

Further, in the formula (7) above, corresponding elements (arranged in the same rows and in the same columns) in the respective blocks Y, Cb and Cr are operated simultaneously.

Further, although the above-mentioned matrix operation can be executed in accordance with software, it is also possible to execute the matrix operation by use of hardware.

In this regard, the circuit configuration shown in FIG. 4 can be applied to a circuit for obtaining the dc component $D_y'$ of the luminance block Y' of the output signals by multiplying the dc component $D_y$ of the luminance block Y by i (a constant other than zero). It also can be applied to a circuit for obtaining the ac component $A_y'$ of the luminance block Y' of the output signals by multiplying the ac component $A_y$ of the luminance block Y by I (a constant other than zero). In FIG. 4, the dc component $D_y$ (ac component $A_y$) may be inputted to the input A of the selector 131 and the multiplier 132, and further the constant i (I) to the multiplier 132.

Further, the circuit configuration shown in FIG. 5 can be applied to a circuit for obtaining the dc components $D_{Cb}'$ and $D_{Cr}'$ of the chrominance block Cb' and Cr' of the output signals by replacing, respectively, the dc components $D_{Cb}$ and $D_{Cr}$ of the chrominance blocks Cb and Cr with j and k (a constant, respectively). It also can be applied to a circuit for obtaining the ac components $A_{Cb}'$ and $A_{Cr}'$ of the chrominance block Cb' and Cr' of the output signals by replacing, respectively, the ac components $A_{Cb}$ and $A_{Cr}$ of the chrominance blocks Cb and Cr with J and K (a constant, respectively). In FIG. 5, the input B of the selector 133 is grounded for inputting zero, however, a constant other than zero may be inputted. For example, the dc component $D_{Cb}$) of the chrominance block Cb and the constant j may be inputted to the inputs A and B of the selector 133, respectively.

Further, the operation for executing the thermographic-image-processing by the video effect processing section 13 will be explained hereinbelow.

In the thermographic-image-processing, the dc components $D_{Cb}'=mD_y+n$ and $D_{Cr}'=pD_y+q$ (m, n, p and q are a constant, respectively) of the chrominance blocks Cb' and Cr' of the output signals are formed on the basis of the dc component $D_y$ of the luminance block Y for forming the discrete cosine transform coefficients. Further, the ac components $A_{Cb}'=MA_y+N$ and $A_{Cr}'=PA_y+Q$ (M, N, P and Q are a constant, respectively) of the chrominance difference blocks Cb' and Cr' of the output signals are formed on the basis of the ac component $A_y$ of the luminance block Y. Further, the dc component $D_y$ and the ac component $A_y$ of the luminance block Y are replaced with s and S (s and S are a constant, respectively), respectively to form the dc component $D_y'$ and the ac component $A_y'$ of the luminance block Y'. By the above-mentioned processing, it is possible to decide chrominance signals according to temperature of an object, and thereby to obtain a thermographic image in which the luminance is kept constant in the formed image.

The above-mentioned arithmetic processing can be obtained by executing the following matrix operations (8) and (9):

$$\begin{pmatrix} D_y' \\ D_{Cb}' \\ D_{Cr}' \\ D_3 \end{pmatrix} = \begin{pmatrix} o & o & o & s \\ m & o & o & n \\ p & o & o & q \\ o & o & o & d \end{pmatrix} \begin{pmatrix} D_y \\ D_{Cb} \\ D_{Cr} \\ 1 \end{pmatrix} \quad (8)$$

where m, n, p, q, s, and d=constant $$\begin{pmatrix} A_y' \\ A_{Cb}' \\ A_{Cr}' \\ A_3 \end{pmatrix} = \begin{pmatrix} 0 & 0 & 0 & S \\ M & 0 & 0 & N \\ P & 0 & 0 & Q \\ 0 & 0 & 0 & D \end{pmatrix} \begin{pmatrix} A_y \\ A_{Cb} \\ A_{Cr} \\ 1 \end{pmatrix} \quad (9)$$

where M, N, P, Q, S, and D=constant

Here, $D_3$ and $A_3$ denote dummy variables, respectively. These dummy variables are not outputted to the IDCT section 14. The reason why these dummy variables are used is to execute the operations by use of a simple determinant.

Further, in the formula (9) above, corresponding elements (arranged in the same rows and in the same columns) in the respective blocks Y, Cb and Cr are operated simultaneously.

Further, although the above-mentioned matrix operation can be executed in accordance with software, it is also possible to execute the matrix operation by use of hardware.

Figure 6:
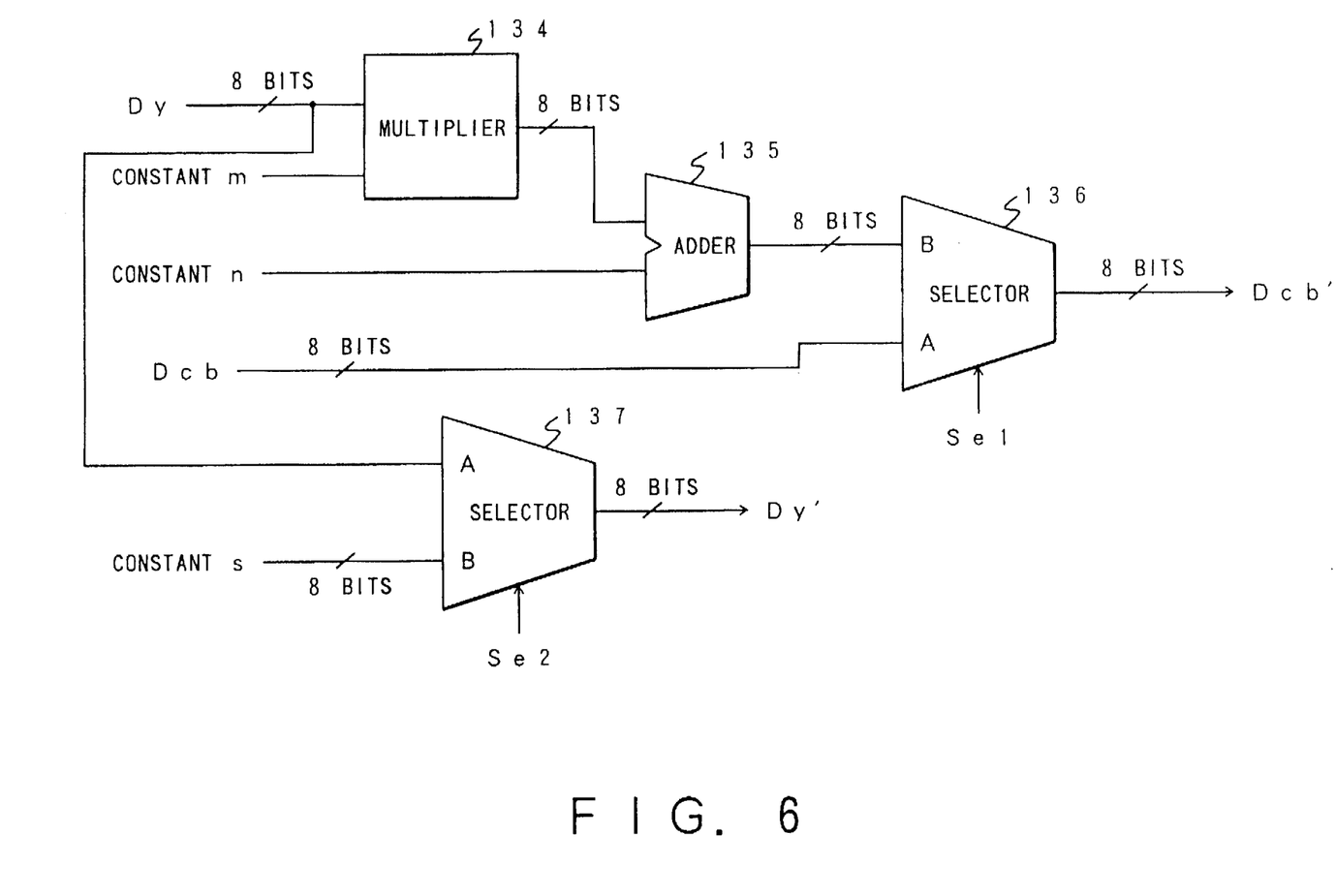
FIG. 6 is an electric circuit diagram showing a structural example of the circuit for executing thermographic-image-processing in the image processing system related to the embodiment according to the present invention shown in FIG. 3.

FIG. 6 shows a circuit for obtaining the dc components $D_{Cb}'=mD_y+n$ (m and n are a constant, respectively) of the chrominance block Cb' of the output signals and for obtaining the dc component $D_y'$ of the luminance block Y' of the output signals by replacing the dc component $D_y$ of the luminance block Y with the constant s. In FIG. 6, the dc component $D_y$ and the constant m are inputted to a multiplier 134. The output dc component $mD_y$ of the multiplier 134 is inputted to an adder 135 that adds the constant n to the dc component $mD_y$ to produce the dc component $D_{Cb}'$. This dc component is inputted to an input B of a selector 136. Inputted to an input A of the selector 136 is the dc component $D_{Cb}$ of the chrominance block Cb. Further, the dc component $D_y$ and the constant s are respectively inputted to inputs A and B of a selector 137.

In the case of the thermographic-image-processing, the selectors 136 and 137 both select the input B under the control of select signals Se1 and Se2. Thus, outputted from the circuit of FIG. 6 are the dc components $D_{Cb}'$ $(=mD_y+n)$ of the chrominance block Cb' and the dc component $D_y'$ of the luminance block Y'.

In the case where the thermographic-image-processing is not conducted, under the control of the select signal Se1, the dc components $D_{Cb}$ of the chrominance block Cb is outputted as it is.

Further, the circuit configuration shown in FIG. 6 can be applied to a circuit for obtaining the dc component $D_{Cr}'= pD_y+q$ (p and q are a constant, respectively) of the chrominance block Cr' of the output signals and the dc component $D_y'$ of the luminance block Y' of the output signals by replacing the dc component $D_y$ of the luminance block Y with the constant s. It also can be applied to a circuit for obtaining the ac component $A_{cb}'=MA_y+N$ (M and N are a constant, respectively) of the chrominance block $C_b'$ of the output signals and the ac component $A_y'$ of the luminance block Y' of the output signals by replacing the ac component $A_y$ of the luminance block Y with the constant S. It also can be applied to a circuit for obtaining the ac component $A_{cr}'=PA_y+Q$ (P and Q are a constant, respectively) of the chrominance block $C_r'$ of the output signals and the ac component $A_y'$ of the luminance block Y' of the output signals by replacing the ac component $A_y$ of the luminance block Y with the constant S. As described above, in the image processing system according to the present invention, since the video effect processing can be executed by operating the discrete cosine transform coefficients, it is unnecessary to store a great amount of processing data required for the respective image processing in a memory unit in the form of tables. As a result, it is possible to reduce an increase in the circuit scale required when the video effect processing function is additionally provided for the ordinary image processing system.

Further, since the video effect processing function can be added to the conventional image processing system, without modifying the system construction largely, it is possible to realize the image processing system relatively easily at a low cost.

Further, in the above-mentioned embodiments, although the image processing system according to the present invention has been explained on the basis of the image processing system for executing the mosaic-, monochromatic- and thermographic-image-processing, it is of course possible to apply the image processing system according to the present invention to the case where only a part of these image processings is adopted or where another processing is used in common with the above-mentioned image processing.

Further, in the above-mentioned embodiments, although the image processing system according to the present invention is applied to the image processing system for decompressing image signals, it is of course possible to apply the image processing system according to the present invention to the image processing system for compressing image signals. In this case, after image signals have been discrete-cosine-transformed and before quantized, the video effect processing is executed by the video effect processing section of the present invention.

As described above, in the image processing system according to the present invention, it is possible to provide an image processing system provided with an additional video effect processing function without much increasing the circuit scale of the conventional image processing system.

What is claimed is:

1. An image processing system having a video effect processing section for thermographic-image-processing inputted discrete cosine transform coefficients and for outputting the processed signals, the video effect processing section comprises:

chrominance dc component processing means for forming dc components $D_{cb}'=mD_y+n$ and $D_{cr}'=pD_y+q$ of chrominance blocks Cb' and Cr' of the output signals by inputting a dc component $D_y$ of a luminance block Y of the discrete cosine transform coefficients, where m, n, p and q are a constant, respectively and where m and p are non-zero;

chrominance ac component processing means for forming ac components $A_{cb}'=MA_y+N$ and $A_{cr}'=PA_y+Q$ of the chrominance blocks Cb' and Cr' of the output signals by inputting an ac component $A_y$ of the luminance block Y, where M, N, P and Q are a constant, respectively and where M and P are non-zero; and luminance component processing means for forming a dc component $D_y'$ and an ac component $A_y'$ of a luminance block Y' of the output signals by replacing the dc component $D_y$ and the ac component $A_y$ with s and S, respectively, where s and S are a constant, respectively, thus deciding chrominance signals according to a temperature of an object to be subjected to the thermographic-image-processing.

2. An image processing system according to claim 1, wherein inversely quantized discrete cosine transform coefficients are inputted to the video effect processing section.

3. An image processing system according to claim 1, wherein the chrominance dc component processing means includes:

first multiplying means for multiplying the dc component $D_y$ by the constants m and p to output corresponding first and second multiplication signals; and first adding means for adding the constants n and q to the first and second multiplication signals, respectively, to output corresponding first and second addition signals;

the chrominance ac component processing means includes:

second multiplying means for multiplying the ac component $A_y$ the constants M and P to output corresponding third and fourth multiplication signals; and second adding means for adding the constants N and Q to the third and fourth multiplication signals, respectively; to output corresponding third and fourth addition signals;

the luminance component processing means includes first selecting means for selecting the dc and ac components $D_y$ and $A_y$, or the constants s and S; and the image processing system further comprises:

second selecting means for selecting dc components $D_{cb}$ and $D_{cr}$ of chrominance blocks $C_b$ and $C_r$ of the discrete cosine transform coefficients or the first and second addition signals; and third selecting means for selecting ac components $A_{cb}$ and $A_{cr}$ of the chrominance blocks $C_b$ and $C_r$, or the third and fourth addition signals, wherein, in the case of the thermographic-image-processing, in response to a select signal, the first, second and third selecting means select the constants s and S, the first and second addition signals and the third and fourth signals, respectively.

4. An image processing method for applying thermographic-image-processing to inputted discrete cosine transform coefficients and outputting the processed signals as output signals, comprising the steps of:

forming dc components $D_{Cb}'=mD_y+n$ and $D_{Cr}'=pD_y+q$ of chrominance blocks Cb' and Cr' of the output signals by inputting a dc component $D_y$ of a luminance block Y of the discrete cosine transform coefficients, where m, n, p and q are constant, respectively and where m and p are non-zero;

forming ac components $A_{Cb}'=MA_y+N$ and $A_{Cr}'=PA_y+Q$ of the chrominance blocks Cb' and Cr' of the output signals by inputting an ac component $A_y$ of the luminance block Y, where M, N, P and Q are a constant, respectively, and where M and P are non-zero; and forming a dc component $D_y'$ and an ac component $A_y'$ of a luminance block Y' of the output signals by replacing the dc component $D_y$ and the ac component $A_y$ with s and S, respectively, where s and S are a constant, respectively, thus deciding chrominance signals according to a temperature of an object to be subjected to the thermographic-image-processing.

5. An image processing method according to claim 4, wherein each forming step is conducted to inversely quantized discrete cosine transform coefficients.

* * * * *